United States Patent
Manna et al.

(10) Patent No.: US 10,271,257 B2
(45) Date of Patent: Apr. 23, 2019

(54) METHODS AND SYSTEMS FOR COORDINATED MULTIPOINT (COMP) ENABLED HANDOVER IN WIRELESS COMMUNICATION NETWORKS

(71) Applicant: Wipro Limited, Bangalore (IN)

(72) Inventors: Avijit Manna, Kolkata (IN); Saptarshi Chaudhuri, Bangalore (IN); Shyam Sundar Pal, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 72 days.

(21) Appl. No.: 15/086,929

(22) Filed: Mar. 31, 2016

(65) Prior Publication Data

US 2017/0289893 A1   Oct. 5, 2017

(30) Foreign Application Priority Data

Mar. 29, 2016 (IN) .............................. 201641010865

(51) Int. Cl.
*H04W 36/26* (2009.01)
*H04B 7/024* (2017.01)
*H04W 36/00* (2009.01)
*H04W 36/28* (2009.01)
(Continued)

(52) U.S. Cl.
CPC ............ *H04W 36/26* (2013.01); *H04B 7/024* (2013.01); *H04W 36/0088* (2013.01); *H04W 36/28* (2013.01); *H04W 36/0069* (2018.08); *H04W 36/30* (2013.01); *H04W 36/32* (2013.01)

(58) Field of Classification Search
None
See application file for complete search history.

(56) References Cited

U.S. PATENT DOCUMENTS

2008/0279152 A1* 11/2008 Kim .................. H04W 36/04
                                                              370/331
2011/0183669 A1    7/2011 Kazmi
2011/0281585 A1   11/2011 Kwon et al.
(Continued)

OTHER PUBLICATIONS

Xu Xiaodong et al., "Handover mechanism in coordinated multipoint transmission/reception system—ZTE corporation", pp. 1-9, Mar. 21, 2010, URL:http://wwwen.zte.com/cn/endata/magazine/ztecommunications/2010Year/no1/articles/201003420100321_181530.html.
(Continued)

*Primary Examiner* — James P Duffy
(74) *Attorney, Agent, or Firm* — Finnegan, Henderson, Farabow, Garrett & Dunner, LLP

(57) ABSTRACT

Methods and systems for Coordinated Multipoint (CoMP) handover in a wireless communication network are disclosed. In an embodiment, the method includes detecting a User Equipment (UE) handover trigger based on an aggregate throughput for each Data Radio Bearers (DRBs) in each CoMP link between the UE and each Neighboring Base Stations (NBS) in a set of NBSs, the UE being in communication with a Serving Base Station (SBS) and each NBS in the set of NBSs through a set of active CoMP links; ranking each NBS based on handover potential of each NBS in the set of NBSs; and selecting a target NBS from the set of NBSs for UE handover based on the ranking and UE support capability information associated with each NBS, wherein a subset of the set of active CoMP links is migrated to the target NBS during the UE handover.

18 Claims, 5 Drawing Sheets

(51) Int. Cl.
  *H04W 36/30* (2009.01)
  *H04W 36/32* (2009.01)

(56) References Cited

U.S. PATENT DOCUMENTS

2012/0002643 A1* 1/2012 Chung ................ H04J 11/0093
                                                  370/331
2012/0252462 A1   10/2012 Fahldieck
2016/0007253 A1    1/2016 Asada

OTHER PUBLICATIONS

Cheng-Chung Lin et al., "On the performance of capacity integrated CoMP handover algorithm in LTE-Advanced", (APCC) *IEEE* 2012, pp. 871-876.
European Search Report dated Oct. 10, 2016 in European Patent Office in counterpart European Patent No. Application 15180919.9. 12 pages.
Wantuan Luo, et al., "A CoMP soft handover scheme for LTE systems in high speed railway", *EURASIP Journal on Wireless Communications and Networking*, 2012, 2012:196, pp. 1-9.

* cited by examiner

METHODS AND SYSTEMS FOR COORDINATED MULTIPOINT (COMP) ENABLED HANDOVER IN WIRELESS COMMUNICATION NETWORKS

TECHNICAL FIELD

This disclosure relates generally to wireless communication networks, and more particularly to methods and systems for Coordinated Multipoint (CoMP) enabled handover in wireless communication networks.

BACKGROUND

In wireless communication networks, a User Equipment (UE) handover decision to one of the Neighbor Base Stations (NBSs) is taken by the Serving Base Station (SBS) based on signal strength experienced by the UE and load at the SBS. In one scenario, a target NBS may fail to provide required resource for establishing Data Radio Bearers (DRBs) post UE handover and may not have sufficient support for all physical resources required by the UE. In another scenario, during the UE handover, the target NBS may deny service based on the QoS required by UE, when the target NBS cannot support the specific QoS due to load on the target NBS.

In both the scenarios, the handover of UE to the target NBS may not be feasible. This may lead to service denial, admission refusal, and throughput drop, thereby, impacting the handover efficiency. The handover efficiency is typically characterized by handover speed, service continuity, DRB admissibility, and throughput maintenance. Thus, the handover initiated based on signal strength experienced by the UE and load at the SBS may have an adverse impact on the handover efficiency.

SUMMARY

In one embodiment, a method of Coordinated Multipoint (CoMP) handover in a wireless communication network is disclosed. The method includes detecting a User Equipment (UE) handover trigger based on an aggregate throughput for each Data Radio Bearers (DRBs) in each CoMP link between the UE and each Neighboring Base Stations (NBS) in a set of NBSs, the UE being in communication with a Serving Base Station (SBS) and each NBS in the set of NBSs through a set of active CoMP links; ranking each NBS based on handover potential of each NBS in the set of NBSs; and selecting a target NBS from the set of NBSs for UE handover based on the ranking and UE support capability information associated with each NBS, wherein a subset of the set of active CoMP links is migrated to the target NBS during the UE handover.

In another embodiment, a communication device for performing CoMP handover in a wireless communication network is disclosed. The communication device includes a processor configured to detect a UE handover trigger based on an aggregate throughput for each DRBs in each CoMP link between the UE and each NBS in a set of NBSs, the UE being in communication with a SBS and each NBS in the set of NBSs through a set of active CoMP links; rank each NBS based on handover potential of each NBS in the set of NBSs; and select a target NBS from the set of NBSs for UE handover based on the ranking and UE support capability information associated with each NBS, wherein a subset of the set of active CoMP links is migrated to the target NBS during the UE handover.

In yet another embodiment, a non-transitory computer-readable storage medium for performing CoMP handover in a wireless communication network is disclosed is disclosed, such that when executed by a computing device, the non-transitory computer-readable storage medium cause the computing device to detect a UE handover trigger based on an aggregate throughput for each DRBs in each CoMP link between the UE and each NBS in a set of NBSs, the UE being in communication with a SBS and each NBS in the set of NBSs through a set of active CoMP links; rank each NBS based on handover potential of each NBS in the set of NBSs; and select a target NBS from the set of NBSs for UE handover based on the ranking and UE support capability information associated with each NBS, wherein a subset of the set of active CoMP links is migrated to the target NBS during the UE handover.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
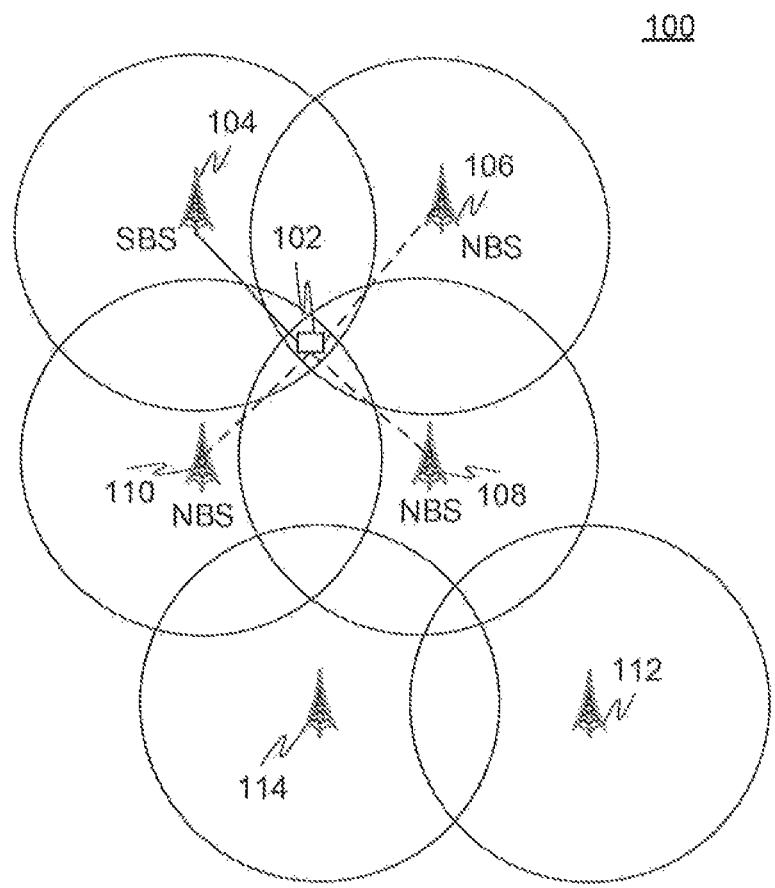
FIG. 1 illustrates an exemplary wireless communication network in which various embodiments may function.

Additional illustrative embodiments are listed below. In one embodiment, an exemplary wireless communication network 100 in which various embodiments may function is illustrated in FIG. 1. Wireless communication network 100 may be a Long Term Evolution (LTE) network and includes a User Equipment (UE) 102 that is in communication with Base Station (BS) 104. Examples of a UE may include, but are not limited to a cell phone, a smart phone, a tablet, a phablet, and a laptop. As UE 102 is on the edge of coverage area of BS 104, which overlaps with coverage area of each of BS 106, BS 108, and BS 110, UE 102 communicates with each of BS 106, BS 108, and BS 110. In this case, BS 104 act as the Serving Base Station (SBS) for UE 102, while each of BS 106, BS 108, and BS 110 act as Neighboring Base Stations (NBSs). Wireless communication network 100 additionally includes a BS 112 and a BS 114. BSs 104-114 may be Evolved Node Base station (eNB) and may communicate amongst each other through an X2 interface.

UE 102 communicates with the SBS, i.e., BS 104, through one or more Radio Resource Controller (RRC) links and each RRC link includes multiple Signal Radio Bearers (SRBs). Additionally, UE 102 communicates with NBSs, i.e., BS 106, BS 108, and BS 110, through one or more Coordinated Multipoint (CoMP) links and each CoMP link further includes multiple Data Radio Bearers (DRBs).

When UE 102 moves out of the coverage area of the SBS, UE 102 is handed over to one of the NBSs, i.e., one of BS 106, BS 108, and BS 110. In this case, the one or more RRC links between UE 102 and the SBS and each CoMP link between UE 102 and the NBSs may have to be terminated. After handover of UE 102 to one of the NBSs, new RRC links and CoMP links may have to be established in order to provide continued service to UE 102. However, termination of each CoMP link before completion of handover of UE 102 to one of the NBS has an adverse impact on throughput and increases latency for service resumption at UE 102.

It will be apparent to a person skilled in the art that wireless communication network 100 is not limited to an LTE network and may include but is not limited to Worldwide Interoperability for Microwave Access (WiMAX), Code Division Multiple Access (CDMA), Enhanced Data rates for GSM Evolution (EDGE), and High Speed Packet Access (HSPA). It will be further apparent to a person skilled in the art that for a wireless communication network other than LTE, network components and parameters associated with that wireless communication network will be used.

Figure 2:
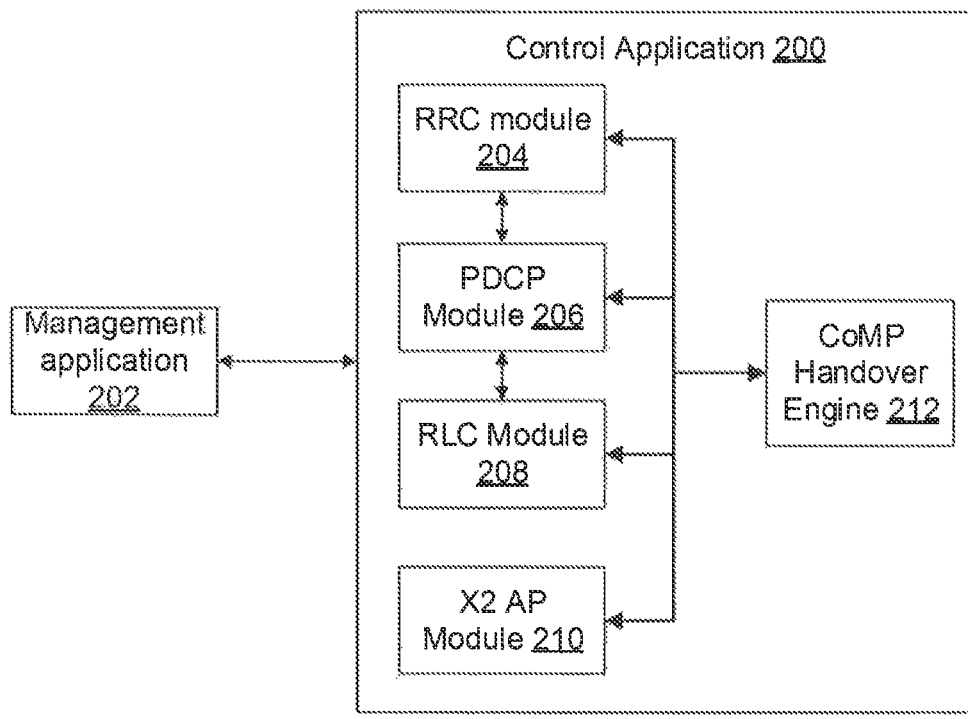
FIG. 2 is a block diagram illustrating communication of various components of a control application with a management application in a Base Station (BS), in accordance with an embodiment.

FIG. 2 is a block diagram illustrating communication of various components of a control application 200 with a management application 202 in a Base Station (BS), in accordance with an embodiment. Control application 200 includes a Radio Resource Controller (RRC) module 204, a Packet Data Convergence Protocol (PDCP) module 206, a Radio Link Control (RLC) module 208, an X2 Application Protocol (AP) module 210, and a CoMP handover engine 212.

Management application 202 performs necessary configuration at initiation of the system and stores it as management application configuration data in its persistent memory. It also receives global information for configuring global data specific to BSs during start-up of the system for configuring BS. Management application 202 include configuration data associated with each of RRC module 204, PDCP module 206, X2 AP module 210, CoMP handover engine 212, and BSs. Configuration data associated with RRC module 204 may include, but is not limited to AntennaInfo, CQI-ReportConfig, LogicalChannelConfig, MAC-MainConfig, PDCP-Config. Further, configuration data for BSs may include, but is not limited to BS transmission power, BS Cell ID, location of a BS, and number of sectors in coverage area of a BS.

At initiation of the system, control application 200 receives CoMP link configuration information from management application 202 through a management application interface (not shown in FIG. 2). This information is then stored in persistent memory of CoMP handover engine 212 to be used as local-configuration. Thereafter, CoMP handover engine 212 extracts necessary configuration information to facilitate handover of a UE by accessing local configuration of CoMP handover engine 212. This extracted information is used to determine appropriate NBS for handover of the UE and accordingly, CoMP handover engine 212 updates configuration information in its persistent-memory. Control application 200 uses this updated configuration information for subsequent instances of UE handover.

Additionally, CoMP handover engine 212 communicates with each of RRC module 204, PDCP module 206, RLC module 208, and an X2 AP module 210 to facilitate efficient handover of the UE in order to provide seamless service to the UE. CoMP handover engine 212 is responsible for taking handover decisions and migrating CoMP links from a current SBS to a new SBS. The migrating may include reuse, recreation, reduction, and increase of CoMP links. The interaction of COMP handover engine 212 with other components of control application 202 may include, for example, CoMP handover engine 212's interaction with RRC module 204 to retrieve measurement information associated with UEs. The measurement information may include, but is not limited to Reference Signal Received Power (RSRP) and location of UE. Further, CoMP handover engine 212 retrieves data ciphering and integrity information from PDCP module 206. CoMP handover engine 212 retrieves transmission mode information, which may include, but is not limited to acknowledge mode, un-acknowledge mode, and transparent mode from RLC module 208. This information may further be provided to PDCP module 206. Further, CoMP handover engine 212 retrieves information about UEs being served by NBSs from X2 AP module 210. Such information may include, but is not limited to UE location and UE measurement reports received by the NBS.

To obtain initial configuration, CoMP handover engine 212 retrieves a list of default NBSs and a set of predefined configuration parameters from management application 202. Thereafter, CoMP handover engine 212 stores the set of predefined configuration parameters in its persistent memory. The predefined configuration parameters include data rate for a service at NBS, a timer for CoMP handover, RSRP, data rate for a service at SBS, weight factor for RSRP, weight factor for DRBs, and weight factor for CoMP links. In an embodiment, the predefined configuration parameters and their associated thresholds may be represented using table 1 given below:

TABLE 1

| Configuration Parameter | Associated Threshold | Description |
|---|---|---|
| Data rate for a service at NBS | $DataNBS_{th}$ | This is the value of data rate of different types of data services for CoMP handover at NBS. If aggregate throughput for each DRB in different CoMP links falls below $DataNBS_{th}$, then a UE handover is triggered. |

TABLE 1-continued

| Configuration Parameter | Associated Threshold | Description |
|---|---|---|
| Timer for CoMP handover | $Timer_{handover}$ | This timer is used to determine the duration for which data throughput at an SBS and the corresponding RSRP falls below associated threshold levels. If the duration of the timer is above the $Timer_{handover}$, a UE handover triggering event is determined. |
| RSRP | $RSRP_{th}$ | The value of RSRP received in a measurement report from an NBS is used to determine handover triggering event. If value of RSRP in the measurement report is below $RSRP_{th}$, then CoMP handover engine 212 waits for the timer for CoMP handover to trigger handover |
| Data rate for a service at SBS | $DataSBS_{th}$ | This is the value of data rate of different types of data services for CoMP handover at SBS. If aggregate throughput for each DRB in different CoMP links falls below $DateSBS_{th}$, then a UE handover is triggered. |
| Weight factor for RSRP ($RSRP_{weight}$) | NA | $RSRP_{weight}$ is used to determine an NBS as a candidate for a UE handover $RSRP_{weight}$ is applied to RSPR value to compute handover potential for an NBS |
| Weight factor for DRBs ($DRB_{weight}$) | NA | $DRB_{weight}$ is used to determine an NBS as a candidate for a UE handover $DRB_{weight}$ is applied to data throughput of CoMP links to compute handover potential for an NBS. $DRB_{weight}$ is determined based on data rate on each DRB |
| Weight factor for CoMP Links ($CoMP_{weight}$) | NA | $CoMP_{weight}$ is used to determine an NBS as a candidate for a UE handover $CoMP_{weight}$ is applied to number of available CoMP links to compute handover potential for an NBS. $COMP_{weight}$ is determined based on the number of CoMP links. |

CoMP handover engine 212 detects a UE handover trigger based on an aggregate throughput for each DRB in each CoMP link between the UE and each NBS in a set of NBSs. The UE is in communication with a SBS and each NBS in the set of NBSs through a set of active CoMP links. For example, for UE 102, BS 104 is the SBS and the set of NBSs include BS 106, BS 108, and BS 110. UE 102 communicates with the set of NBSs through multiple CoMP links. UE 102 may have more than one CoMP link with each NBS.

After detecting the handover trigger, CoMP handover engine 212 ranks each NBS in the set of NBSs based on handover potential of each NBS. For example, for UE 102, CoMP handover engine 212 may rank each of BS 106, BS 108, and BS 110 based on their respective handover potential. Thereafter, based on the ranking and UE support capability information associated with each NBS, CoMP handover engine 212 selects a target NBS from the set of NBSs for UE handover. During the UE handover, a subset of the set of active CoMP links is migrated to the target NBS during the UE handover. For example, for UE 102, CoMP handover engine 212 selects BS 106 as the target NBS handover of UE 102 based on handover potential rank of BS 106 and its UE support capability. This is further explained in detail in conjunction with FIG. 3.

Figure 3:
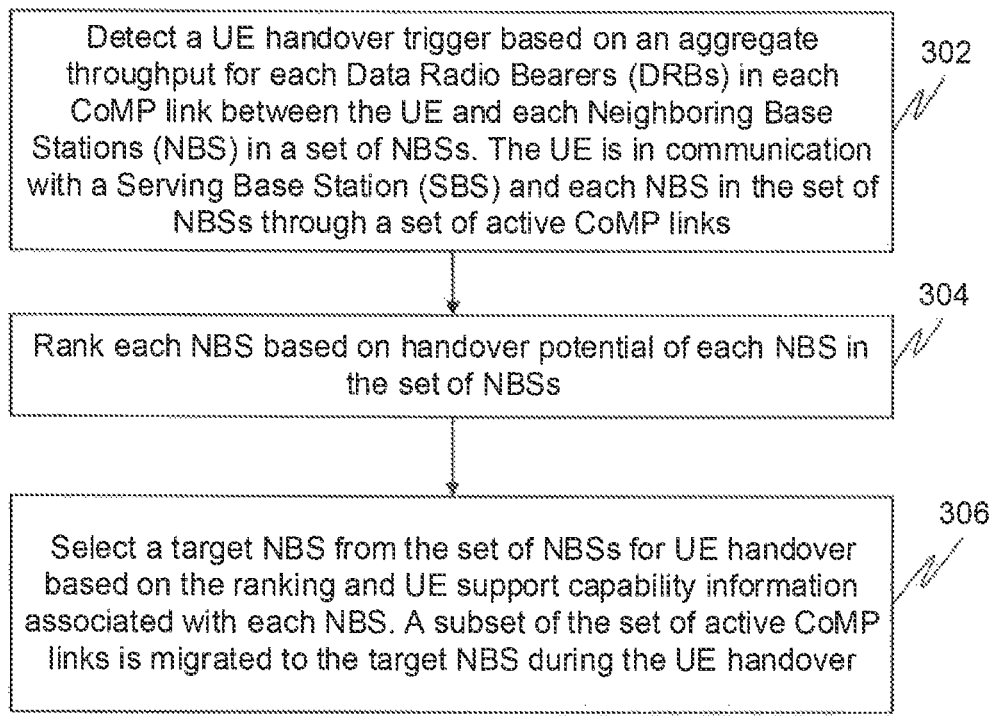
FIG. 3 illustrates a flowchart of a method for Coordinated Multipoint (CoMP) handover in a wireless communication network, in accordance with an embodiment

FIG. 3 illustrates a flowchart of a method for CoMP handover in a wireless communication network, in accordance with an embodiment. At initialization, CoMP handover engine 212 retrieves the set of predefined configuration parameters and the associated thresholds from management application 202. The set of predefined configuration parameters may include, but are not limited to data rate for a service at NBS, a timer for CoMP handover, RSRP, data rate for a service at SBS, weight factor for RSRP, weight factor for DRBs, and weight factor for CoMP links. These parameters and associated thresholds have been explained in detail in conjunction with Table 1 given in FIG. 2 above. The set of predefined configuration parameters are then configured in CoMP handover engine 212 and stored in a local copy of its persistent memory.

However, in case there is a change in the configuration, then CoMP handover engine 212 receives configuration information of BSs in the wireless communication network from management application 202. Based on this, the latest set of predefined configuration parameters and the associated thresholds are configured in CoMP handover engine 212 and stored in a local copy of its persistent memory.

In order to assess whether the UE requires a handover or not, CoMP handover engine 212 receives UE measurement reports from the UE. The UE measurement reports include RSRP information associated with each NBS in a set of NBSs, with which the UE has a set of active CoMP links. The UE may have more than one CoMP links with one NBS. The UE measurement reports are then used to determine signal strength for each active CoMP link established with each of the set of NBSs. In an exemplary embodiment, the signal strength may be determined as described below:

Step 1: Receive measurement reports from the UE and store as:
UEMeasReport (1 . . . n)
where,
n is number of NBS.

Step 2: For each NBS in UEMeasReport(1 . . . n), if an NBS is in CoMPList, RSRP extract RSRP value.

Step 3: For each NBS, if RSRP value of an NBS<=$RSRP_{th}$, store as:
$RSRP_{NBS}$(i,RSRP)
Where,
"i" represents an NBS.

At 302, CoMP handover engine 212 detects a UE handover trigger based on an aggregate throughput for each DRBs in each CoMP link between the UE and each NBS in the set of NBSs. To this end, CoMP handover engine 212 compares the aggregate throughput with an associated threshold. A UE handover is triggered when the aggregate throughput falls below the associated threshold. In an exemplary embodiment, the UE handover trigger may be determined by CoMP handover engine 212 as described below:

Step 1: CoMP handover engine 212 calculates throughput of each CoMP link in the set of active CoMP links, which is represented as:
(CoMPList<1, 2 . . . , n>)
where,
n is the total number of active CoMP links between the UE and the set of NBSs:
The throughput is calculated by executing the following:
1. Receive information for each CoMP link in (CoMPList<1, 2 . . . , n>) at SBS.
2. For each DRB in each active CoMP link in (CoMPList<1, 2 . . . , n>), extract throughput and store as: $Data_{thput}$(j,$DRB_{th}$),
where,
j represents a DRB and varies between (1 . . . Num(DRBList)),
$DRB_{th}$ is the data throughput for $j^{th}$ DRB.
3. For each CoMP link in (CoMPList<1, 2 . . . , n>):
If,
$Datat_{hput}$(j, DRBth)<=DataSBSth,
Store,
$DRB_{thput}$(j, $Data_{th}$) in $CoMP_{thput}$(i,$DRB_{thput}$),
where,
"i" represents an active CoMP link and varies between (1 . . . Num(CoMPList)),
$CoMP_{thput}$ is data throughput for $i^{th}$ active CoMP link.

Step 2: CoMP handover engine 212 determines number of CoMP links at SBS by executing the following:
1. Receive NBS CoMPList and compare NBS CoMP links with SBS CoMP links.
2. For each NBS in CoMPList in SBS identify the number of active CoMP links.
3. For each active CoMP link identified above, count number of DRBs running in NBS and store as:
$LinkCount_{handover}$(i, $DRB_{No}$),
where,
$DRB_{No}$ is the number of DRBs in an active CoMP link,
"i" represents an active CoMP link and varies between (1 . . . Num(CoMPList)).

Thereafter, at 304, CoMP handover engine 212 ranks each NBS in the set NBSs based on handover potential of each NBS. The handover potential of each NBS in the set of NBSs is determined based on handover suitability parameters associated with each NBS. The handover suitability parameters may include, but are not limited to number of available CoMP links for each NBS, data throughput of CoMP links for each NBS, and RSRP associated with each NBS. In an embodiment, to determine handover potential of an NBS, associated weights are assigned to each handover suitability parameter. For example, $DRB_{weight}$ is the weight assigned to data throughput of CoMP links for each NBS, $RSRP_{weight}$ is the weight assigned to RSRP associated with each NBS, and $CoMP_{weight}$ is the weight assigned to number of available CoMP links for each NBS. In an exemplary embodiment, to rank NBSs, CoMP handover engine 212 starts $Timer_{handover}$ executes following steps for each NBS in the SBS:

Step 1: Extract DRB throughput for each CoMP link from $CoMP_{thput}$(i,$DRB_{thput}$) and store as: TP (i)
Step 2: Extract RSRP (i) from $RSRP_{NBS}$(i,RSRP)
Step 3: Extract CoMP Link count from $LinkCount_{handover}$ (i, $DRB_{No}$) and store as: CoMPList LinkCount(i)
Step 4: Determine handover potential for an NBS using equation given below:

$Handover_{Pot}(i) = (TP(i)*DRB_{weight}) + (RSRP(i)*RSRP_{weight}) + (LinkCount_{handover}(i, DRB_{No})*CoMP_{weight})$ where,
$Handover_{Pot}(i)$ is the handover potential of an NBS, "i" varies from (1 . . . Num(CoMPList)).
Step 5: Rank $Handover_{Pot}$ based on Max ($Handover_{Pot}(i)$) as $RankHandover_{Pot}$ (i),
where,
Max($Handover_{Pot}(i)$) determines the maximum value of $Handover_{Pot}$ After each NBS in the set of NBSs has been assigned a rank, at 306, COMP handover engine 212 selects a target NBS from the set of NBSs for UE handover based on the ranking and UE support capability information associated with each NBS. The UE support capability of an NBS is the capability of the NBS to support requisite number of Signal Radio Bearers (SRBs) and DRBs. During the UE handover, a subset of the set of active CoMP links is migrated from the SBS to the target NBS, which will serve as the new SBS for the UE post handover. Additionally, one or more new CoMP links are also created at the target NBS to support the UE handover. In an exemplary embodiment, to select a target NBS for UE handover, CoMP handover engine 212 may perform the following steps for each NBS in $RankHandover_{Pot}(i)$:

Step 1: If an NBS can support required number of SRB and DRBs, $Timer_{handover}$ is stopped and the NBS is considered as final candidate for UE handover and stored as $NBS_{Handover}$.
Step 2: Store following information at $NBS_{Handover}$:
1. Determine and count DRBs to be supported by current active CoMP links and store this information as:
ServedDRBs(Id, CoMPList)
where,
Id is DRB id for distinguishing different DRBs running on same BS in CoMP Set,
CoMPList is active CoMP links used in SBS which can be migrated to the NBS during the UE handover.
2. Determine and count DRBs to be supported by establishing new CoMP links in the NBS and store this information as:
ServedDRBs(Id, NonCoMPList)
where,
Id is DRB id for distinguishing different DRBs running on same BS in CoMPList,
NonCoMPList is new CoMP links to be established with CoMP Set element in the NBS after the UE handover.

Thereafter, the UE handover between the SBS and the target NBS is executed. To this end, in an embodiment, the set of CoMP links at the target NBS is modified based on the change of UE throughput and UE support capability of the set of CoMP links at the target NBS. Thereafter, the subset of the set of active CoMP links, which have been migrated from the SBS and the one or more new CoMP links that were created are consolidated at the target NBS. In an exemplary embodiment, CoMP links at the target NBS may consolidated as described below:

Step 1: Check the count of CoMP links in $NBS_{Handover}$

Step 2: Determine channel quality for each CoMP link at the target NBS

Step 3: If two or more DRB can be merged, the count of CoMP links is represented as:

$CoMPLink_{Con}(n)$, where, n is number of CoMP links after consolidation.

Once the UE handover is confirmed, DRBs are established between the UE and the target NBS. In an exemplary embodiment, the DRBs may be established as described below:

Step 1: Extract SRB information from $NBS_{Handover}$

Step 2: Establish CoMP links for SRB through handover

Step 3: Extract DRB information from $NBS_{Handover}$

Step 4: For each $i_{th}$ DRB in ServedDRBs (Id, CoMPList) in $NBS_{Handover}$:

Establish CoMP links with CoMP set in NBS, where, i varies between (1 . . . Num(ServedDRBs(Id, CoM-PList))), Step 5: For each $j_{th}$ DRB in ServedDRBs (Id, NonCoM-PList) in $NBS_{Handover}$:

Establish CoMP links with CoMP set in NBS where, j varies between (1 . . . Num(ServedDRBs(Id, Non-CoMPList)))

After the DRBs have been established, the UE handover from the SBS to the target NBS is completed and throughput capability at the target NBS is validated. In an exemplary embodiment, the throughput capability at the target NBS may be validated as described below:

Step 1: For each $i_{th}$ DRB of CoMP links at $NBS_{Handover}$, perform the following:

1. Calculate throughput as $NBSDRB_{th}$

2. Determine aggregate throughput using equation given below:

$NBSAGGR_{th} = \Sigma\ NBSDRB_{th}$

Where, i varies between (1 . . . $CoMPLink_{Con}(n)$)

3. If $NBSAGGR_{th<}=DataNBS_{th}$, rearrange CoMP links at the target NBS.

After validation has been performed, handover suitability parameters are adapted or modified to meet requisite throughout at the target NBS for future UE handovers.

During handover of the UE from the SBS to a target NBS in the claimed method, all the active CoMP links are not terminated and one or more of these CoMP links are migrated to the target NBS. As a result, the problems of reduced throughput due to arrangement and rearrangement of CoMP links and latency for service resumption in conventional methods is resolved. Moreover, the target NBS is selected after ranking NBSs using a number of handover suitability parameters of NBSs and their UE support capability. As a result, issues of admission refusal and/or service refusal in case of multiple CoMP Links are avoided during UE handover. Additionally, as the target NBS of claimed method can accommodate additional DRBs and SRBs that were earlier provided by the SBS, problems in service continuity and throughput maintenance that had an impact on handover efficiency are also resolved.

Figure 4:
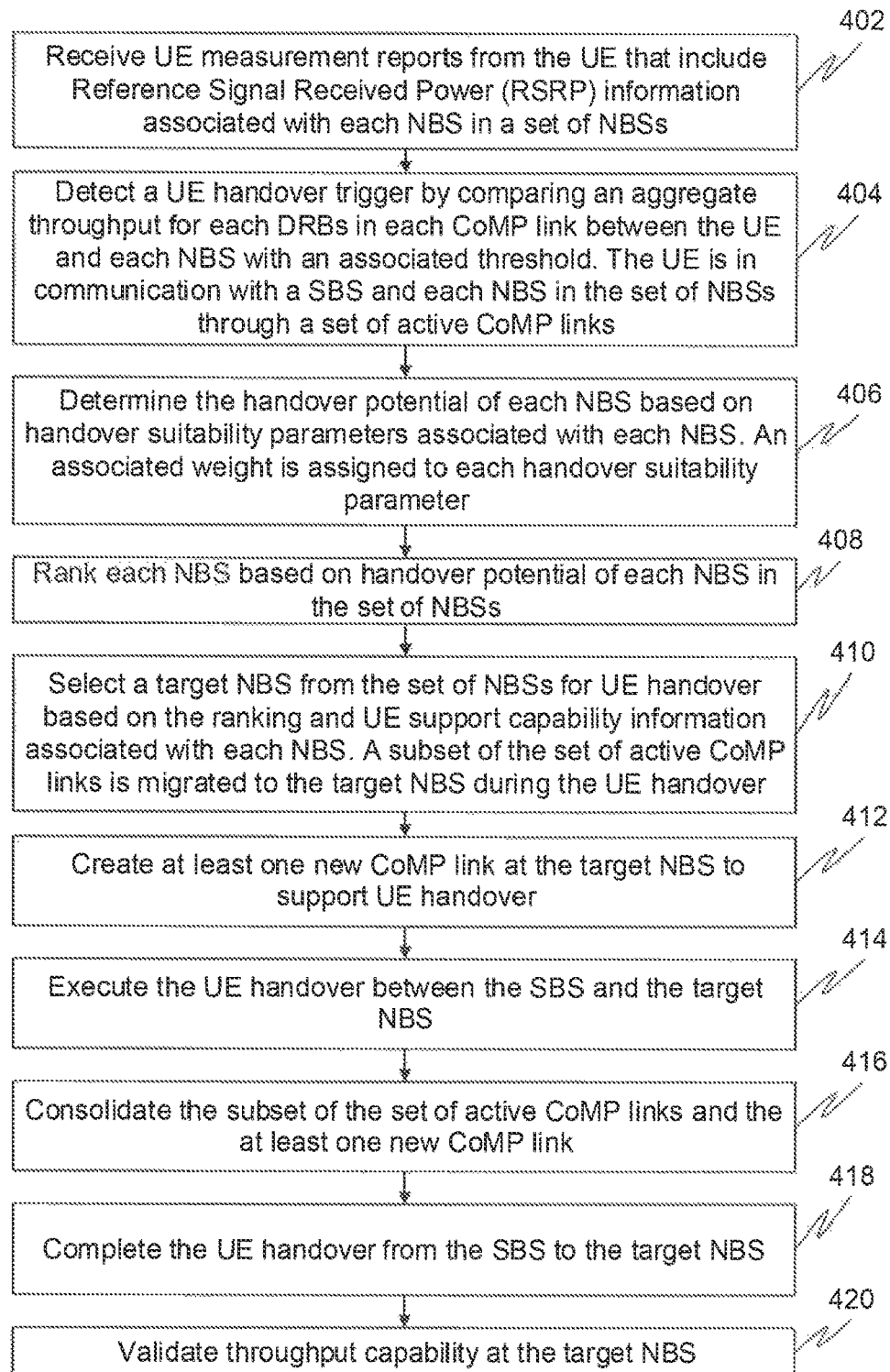
FIG. 4 illustrates a flowchart of a method for CoMP handover in a wireless communication network, in accordance with another embodiment.

FIG. 4 illustrates a flowchart of a method for CoMP handover in a wireless communication network, in accordance with another embodiment. At 402, CoMP handover engine 212 receives UE measurement reports from the UE that include RSRP information associated with each NBS in a set of NBSs. At 404, CoMP handover engine 212 detects a UE handover trigger by comparing an aggregate throughput for each DRBs in each CoMP link between the UE and each NBS with an associated threshold. The UE is in communication with a SBS and each NBS in the set of NBSs through a set of active CoMP links. At 406, CoMP handover engine 212 determines the handover potential of each NBS based on handover suitability parameters associated with each NBS. An associated weight is assigned to each handover suitability parameter. This has been explained in detail in conjunction with FIG. 3 given above.

Thereafter, at 408, CoMP handover engine 212 ranks each NBS based on handover potential of each NBS in the set of NBSs. Based on the ranking and UE support capability information associated with each NBS, CoMP handover engine 212, at 410, selects a target NBS from the set of NBSs for UE handover. A subset of the set of active CoMP links is also migrated to the target NBS during the UE handover. In addition to migrating CoMP links, at 412, one or more new CoMP links are also created at the target NBS to support UE handover. At 414, the UE handover between the SBS and the target NBS is executed and at 416 the subset of the set of active CoMP links and the one or more new CoMP links are consolidated. The UE handover from the SBS to the target NBS is thus completed at 418. Thereafter, at 420, throughput capability at the target NBS is validated. This has been explained in detail in conjunction with FIG. 3 given above.

Figure 5:
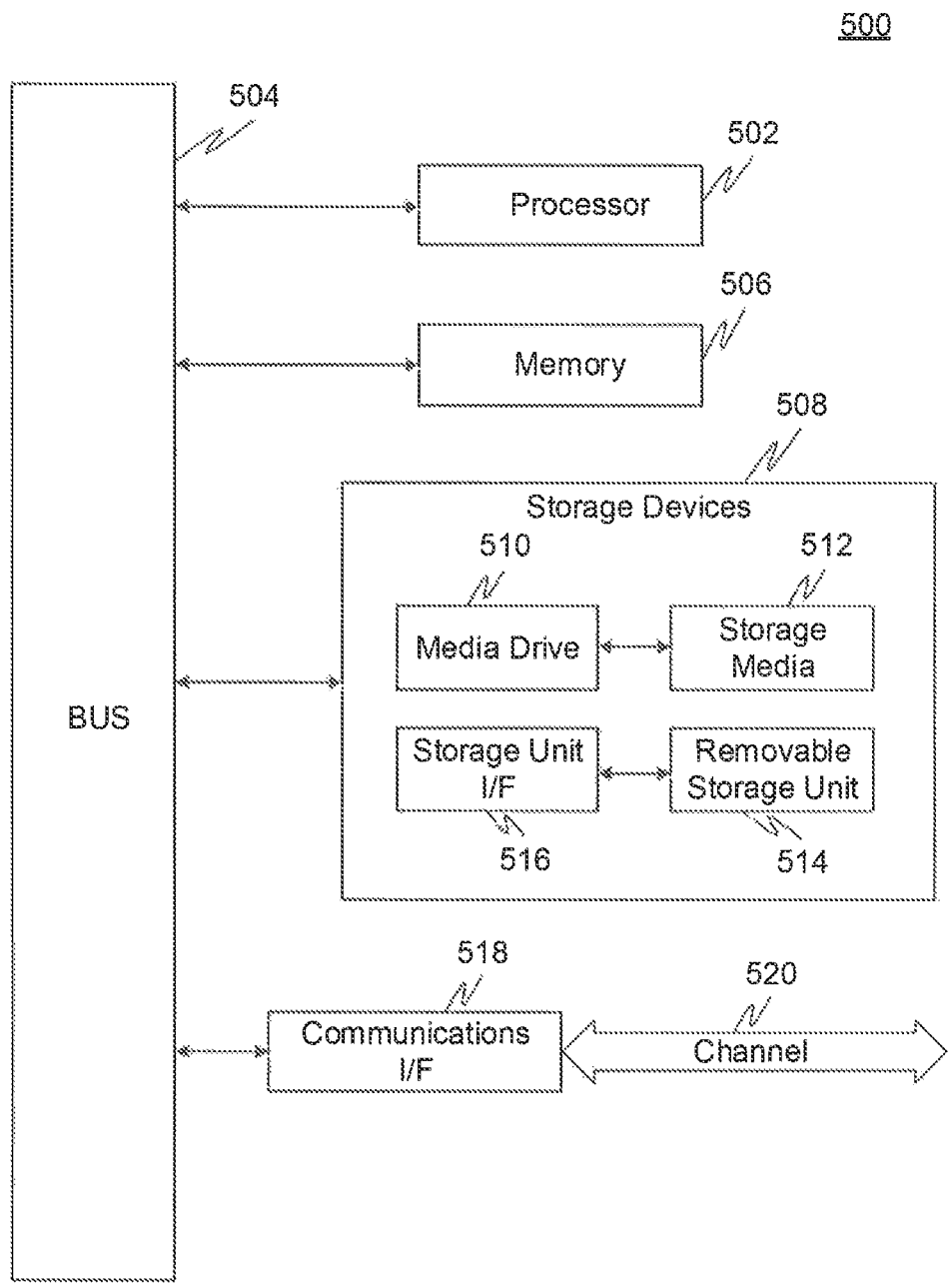
FIG. 5 illustrates an exemplary computing system that may be employed to implement processing functionality for various embodiments.

FIG. 5 illustrates an exemplary computing system 500 that may be employed to implement processing functionality for various embodiments (e.g., as a SIMD device, client device, server device, one or more processors, or the like). Those skilled in the relevant art will also recognize how to implement the invention using other computer systems or architectures. Computing system 500 may represent, for example, a user device such as a desktop, an activity mon monitoring device, a wearable portable electronic device, a mobile phone, personal entertainment device, DVR, and so on, or any other type of special or general purpose computing device as may be desirable or appropriate for a given application or environment. Computing system 500 can include one or more processors, such as a processor 502 that can be implemented using a general or special purpose processing engine such as, for example, a microprocessor, microcontroller or other control logic. In this example, processor 502 is connected to a bus 504 or other communication medium.

Computing system 500 can also include a memory 506 (main memory), for example, Random Access Memory (RAM) or other dynamic memory, for storing information and instructions to be executed by processor 502. Memory 506 also may be used for storing temporary variables or other intermediate information during execution of instructions to be executed by processor 502. Computing system 500 may likewise include a read only memory ("ROM") or other static storage device coupled to bus 504 for storing static information and instructions for processor 502.

Computing system 500 may also include storage devices 508, which may include, for example, a media drive 510 and a removable storage interface. The media drive 510 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 512 may include, for example, a hard disk, magnetic tape, flash drive, or other fixed or removable medium that is read by and written to by media drive 510. As these examples illustrate, storage media 512 may include a computer-readable storage medium having stored therein particular computer software or data.

In alternative embodiments, storage devices 508 may include other similar instrumentalities for allowing computer programs or other instructions or data to be loaded into computing system 500. Such instrumentalities may include, for example, a removable storage unit 514 and a storage unit interface 516, such as a program cartridge and cartridge interface, a removable memory (for example, a flash memory or other removable memory module) and memory slot, and other removable storage units and interfaces that allow software and data to be transferred from removable storage unit 514 to computing system 500.

Computing system 500 can also include a communications interface 518. Communications interface 518 can be used to allow software and data to be transferred between computing system 500 and external devices. Examples of communications interface 518 can include a network interface (such as an Ethernet or other NIC card), a communications port (such as for example, a USB port, a micro USB port), Near field Communication (NFC), etc. Software and data transferred via communications interface 518 are in the form of signals which can be electronic, electromagnetic, optical, or other signals capable of being received by communications interface 518. These signals are provided to communications interface 518 via a channel 520. Channel 520 may carry signals and may be implemented using a wireless medium, wire or cable, fiber optics, or other communications medium. Some examples of channel 520 include a phone line, a cellular phone link, an RF link, a Bluetooth link, a network interface, a local or wide area network, and other communications channels.

In this document, the terms "computer program product" and "computer-readable medium" may be used generally to refer to media such as, for example, memory 506, storage devices 508, removable storage unit 514, or signal(s) on channel 520. These and other forms of computer-readable media may be involved in providing one or more sequences of one or more instructions to processor 502 for execution. Such instructions, generally referred to as "computer program code" (which may be grouped in the form of computer programs or other groupings), when executed, enable computing system 500 to perform features or functions of embodiments of the present invention.

In an embodiment where the elements are implemented using software, the software may be stored in a computer-readable medium and loaded into computing system 500 using, for example, removable storage unit 514, media drive 510 or communications interface 518. The control logic (in this example, software instructions or computer program code), when executed by processor 502, causes processor 502 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for Coordinated Multipoint (CoMP) handover in a wireless communication network. During handover of the UE from the SBS to a target NBS in the claimed method, all the active CoMP links are not terminated and one or more of these CoMP links are migrated to the target NBS. As a result, the problems of reduced throughput due to arrangement and rearrangement of CoMP links and latency for service resumption in conventional methods is resolved. Moreover, the target NBS is selected after ranking NBSs using a number of handover suitability parameters of NBSs and their UE support capability. As a result, issues of admission refusal and/or service refusal in case of multiple CoMP Links are avoided during UE handover. Additionally, as the target NBS of claimed method can accommodate additional DRBs and SRBs that were earlier provided by the SBS, problems in service continuity and throughput maintenance that had an impact on handover efficiency are also resolved.

The specification has described methods and systems for Coordinated Multipoint (CoMP) handover in a wireless communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of Coordinated Multipoint (CoMP) handover in a wireless communication network, the method comprising:
    detecting a User Equipment (UE) handover trigger based on an aggregate throughput for each Data Radio Bearers (DRBs) in each CoMP link between the UE and each Neighboring Base Stations (NBS) in a set of NBSs, the UE being in communication with a Serving Base Station (SBS) and each NBS in the set of NBSs through a set of active CoMP links;
    ranking each NBS based on the handover potential of each NBS in the set of NBSs based on handover suitability parameters associated with each NBS;
    selecting a target NBS from the set of NBSs for UE handover based on the ranking and UE support capability information associated with each NBS;
    migrating a subset of the set of active CoMP links from a current SBS to the target NBS during the UE handover, wherein the migrated subset of the set of active CoMP links are reused and recreated in the target NBS which serves as a new SBS after the UE handover, and wherein the handover suitability parameters are adapted to meet requisite throughput at the target NBS; and
    modifying a number of the migrated subset of the set of active CoMP links at the target NBS based on change of UE throughput and UE support capability of the set of active CoMP links at the target NBS.

2. The method of claim 1 further comprising receiving UE measurement reports from the UE, the UE measurement reports comprising Reference Signal Received Power (RSRP) information associated with each NBS in the set of NBSs.

3. The method of claim 1, wherein detecting the handover trigger comprises comparing the aggregate throughput with an associated threshold, a UE handover being triggered when the aggregate throughput falls below the associated threshold.

4. The method of claim 1, wherein the handover suitability parameters are selected from a group comprising number of available CoMP links for each NBS, data throughput of CoMP links for each NBS, and RSRP associated with each NBS.

5. The method of claim 1, wherein determining handover potential comprises assigning an associated weight to each handover suitability parameter.

6. The method of claim 1, wherein the UE support capability of an NBS in the set of NBSs corresponds to capability of the NBS to support requisite number of Signal Radio Bearers (SRBs) and DRBs.

7. The method of claim 1, further comprising creating at least one new CoMP link at the target NBS to support UE handover.

8. The method of claim 7, further comprising consolidating the subset of the set of active CoMP links and the at least one new CoMP link.

9. The method of claim 8, further comprising validating throughput capability at the target NBS in response to consolidating.

10. A communication device to perform Coordinated Multipoint (CoMP) handover in a wireless communication network, the communication device comprising:
    a processor configured to:
        detect a User Equipment (UE) handover trigger based on an aggregate throughput for each Data Radio Bearers (DRBs) in each CoMP link between the UE and each Neighboring Base Stations (NBS) in a set of NBSs, the UE being in communication with a Serving Base Station (SBS) and each NBS in the set of NBSs through a set of active CoMP links;
        rank each NBS based on handover potential of each NBS in the set of NBSs based on handover suitability parameters associated with each NBS;
        select a target NBS from the set of NBSs for UE handover based on the ranking and UE support capability information associated with each NBS;
        migrate a subset of the set of active CoMP links from a current SBS to the target NBS during the UE handover, wherein the migrated subset of the set of active CoMP links are reused and recreated in the target NBS which serves as a new SBS after the UE handover, and wherein the handover suitability parameters are adapted to meet requisite throughput at the target NBS; and
        modify a number of the migrated subset of the set of active CoMP links at the target NBS based on change of UE throughput and UE support capability of the set of active CoMP links at the target NBS.

11. The communication device of claim 10, wherein the processor is further configured to receive UE measurement reports from the UE, the UE measurement reports comprising Reference Signal Received Power (RSRP) information associated with each NBS in the set of NBSs.

12. The communication device of claim 10, wherein to detect the handover trigger, the processor is further configured to compare the aggregate throughput with an associated threshold, a UE handover being triggered when the aggregate throughput falls below the associated threshold.

13. The communication device of claim 10, wherein to determine handover potential, the processor is further configured to assign an associated weight to each handover suitability parameter.

14. The communication device of claim 10, wherein the processor is further configured to create at least one new CoMP link at the target NBS to support UE handover.

15. The communication device of claim 14, wherein the processor is further configured to consolidate the subset of the set of active CoMP links and the at least one new CoMP link.

16. The communication device of claim 10, wherein the communication device is one of a BS and a UE.

17. A non-transitory computer-readable storage medium to perform Coordinated Multipoint (CoMP) handover in a wireless communication network, cause the computing device to:
    detect a UE handover trigger based on an aggregate throughput for each Data Radio Bearers (DRBs) in each CoMP link between the UE and each Neighboring Base Stations (NBS) in a set of NBSs, the UE being in communication with a Serving Base Station (SBS) and each NBS in the set of NBSs through a set of active CoMP links;
    rank each NBS based on handover potential of each NBS in the set of NBSs based on handover suitability parameters associated with each NBS;
    select a target NBS from the set of NBSs for UE handover based on the ranking and UE support capability information associated with each NBS;
    migrate a subset of the set of active CoMP links from a current SBS to the target NBS during the UE handover, wherein the migrated subset of the set of active CoMP links are reused and recreated in the target NBS which serves as a new SBS after the UE handover, and wherein the handover suitability parameters are adapted to meet requisite throughput at the target NBS; and modify a number of the migrated subset of the set of active CoMP links at the target NBS based on change of UE throughput and UE support capability of the set of active CoMP links at the target NBS.

18. The method of claim 1, wherein during the UE handover from the current SBS to the target NBS, migrating the subset of active CoMP links from the current SBS to the target NBS, without terminating the subset of active CoMP links.

* * * * *